United States Patent
Katzur (10) Patent No.: US 8,355,457 B2
(45) Date of Patent: Jan. 15, 2013

(54) CORRECTION-CALCULATION ALGORITHM FOR ESTIMATION OF THE SIGNAL TO NOISE RATIO IN HIGH BIT RATE DMT MODULATION

(75) Inventor: Ran Katzur, N. Potomac, MD (US)

(73) Assignee: LSI Corporation, Milpitas, CA (US)

( * ) Notice: Subject to any disclaimer, the term of this patent is extended or adjusted under 35 U.S.C. 154(b) by 1418 days.

(21) Appl. No.: 10/973,585

(22) Filed: Oct. 26, 2004

(65) Prior Publication Data

US 2006/0088117 A1    Apr. 27, 2006

(51) Int. Cl.
*H04L 5/12* (2006.01)
*H04L 23/02* (2006.01)

(52) U.S. Cl. ........................................... 375/261
(58) Field of Classification Search ............... 375/260, 375/341, 268, 316, 233, 222, 346, 340, 261; 370/210; 455/192, 258, 522; 709/204; 714/755, 714/794
See application file for complete search history.

(56) References Cited

U.S. PATENT DOCUMENTS

| | | | | |
|---|---|---|---|---|
| 5,677,779 A * | 10/1997 | Oda et al. | | 398/137 |
| 5,832,041 A * | 11/1998 | Hulyalkar | | 375/340 |
| 6,134,273 A * | 10/2000 | Wu et al. | | 375/261 |
| 6,154,502 A * | 11/2000 | Brun et al. | | 375/261 |
| 6,449,246 B1 * | 9/2002 | Barton et al. | | 370/210 |
| 6,463,094 B2 * | 10/2002 | Koifman et al. | | 375/222 |
| 6,690,723 B1 * | 2/2004 | Gosse et al. | | 375/233 |
| 6,721,373 B1 * | 4/2004 | Frenkel et al. | | 375/346 |
| 7,139,323 B2 * | 11/2006 | Erving et al. | | 375/260 |
| 7,263,134 B2 * | 8/2007 | Agazzi et al. | | 375/285 |
| 2002/0106035 A1 * | 8/2002 | Harikumar et al. | | 375/316 |
| 2002/0136318 A1 * | 9/2002 | Gorokhov et al. | | 375/261 |
| 2002/0147953 A1 * | 10/2002 | Catreux et al. | | 714/746 |
| 2003/0039306 A1 * | 2/2003 | Redfern | | 375/222 |
| 2003/0187928 A1 * | 10/2003 | MacLeod et al. | | 709/204 |
| 2005/0047524 A1 * | 3/2005 | Chiu et al. | | 375/316 |
| 2007/0063770 A1 * | 3/2007 | Rexberg | | 330/149 |

* cited by examiner

*Primary Examiner* — David C. Payne
*Assistant Examiner* — Tanmay Shah
(74) *Attorney, Agent, or Firm* — Clark Hill PLC (57) ABSTRACT

A method for correcting signals received on a channel. Signals are received along the channel and it is determined how many of the signals are outside a predetermined range relative to a plurality of predetermined constellation points (i.e., erasures). Then, the noise power is estimated the noise power based on the number erasures, and the noise power is used to correct the signals. Specifically, the estimated noise power can be used to correct the signals which have been determined to be outside the predetermined range and which have been determined to contain a large error component (i.e., based on distance from the closest constellation point). A look up table can be used to determine the correction to be applied, and a separate look up table can be used for each tone.

13 Claims, 6 Drawing Sheets

CORRECTION-CALCULATION ALGORITHM FOR ESTIMATION OF THE SIGNAL TO NOISE RATIO IN HIGH BIT RATE DMT MODULATION

BACKGROUND

Transferring digital data over a medium is performed using a modulation/demodulation scheme. A discrete multitone modulation method is commonly used in DSL. In DMT modulation, the transferred bits are divided between each one of the discrete tones in such a way to achieve maximum transmit rate with minimum Bit Error Rate (BER). Estimation of the signal to noise ratio (SNR) for each discrete tone is essential to determine how many bits will be assigned to each tone to achieve the desired BER.

U.S. patent application Ser. No. 10/739,388, assigned to the same assignee as the present application, describes a method to estimate the signal to noise ratio that is used in ADSL link. To determine the signal to noise ratio in the channel, the transmit side transmits a known signal—a reverb signal using a 4QAM (quadratic Amplitude Modulation) modulation. 4QAM constellation has four constellation points, each representing two bits of information. The reverb signal is a fixed pseudo random sequence with equal probability to each of the four constellation points—P1, P2, P3 and P4. The power of the transmitted signal is a constant. The receiver determines the power of the noise process by analyzing the distance of the received data values from the constellation points.

Figure 1:
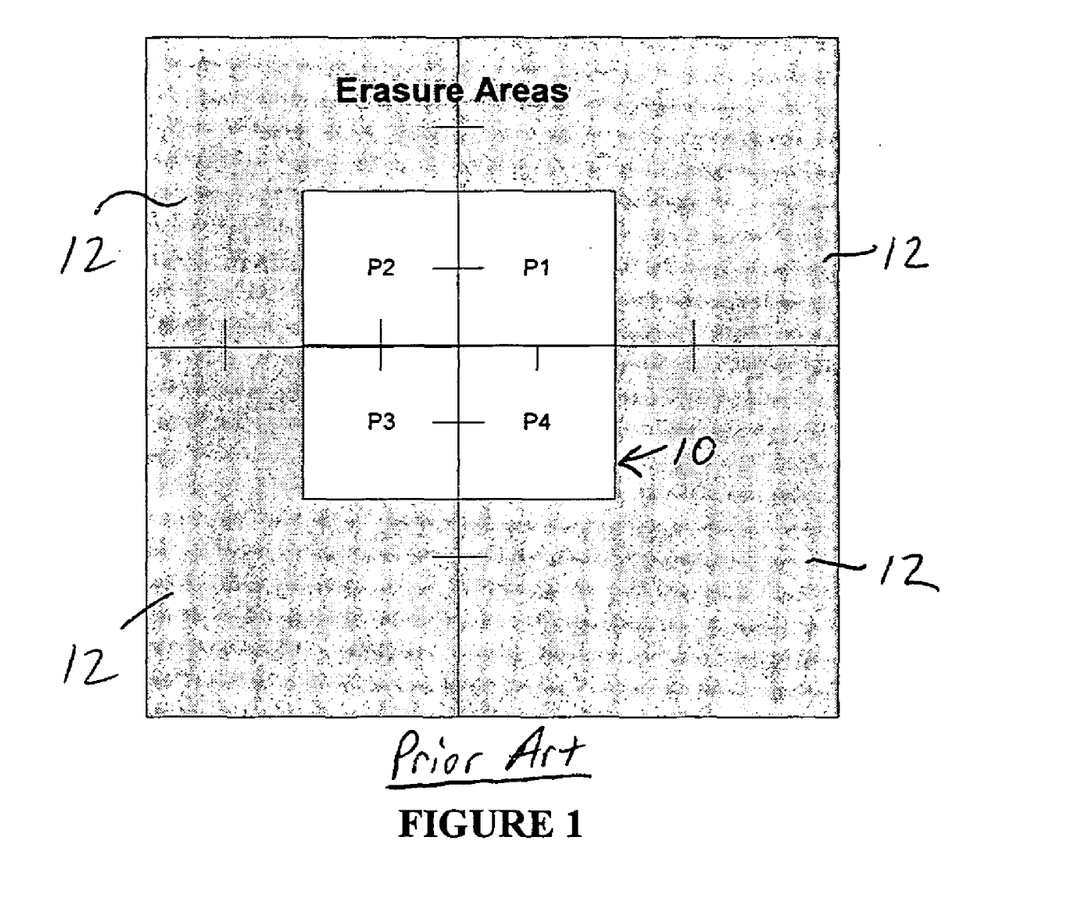
FIG. 1 illustrates the constellation domain in a receiver.

FIG. 1 illustrates the constellation domain in the receiver. In FIG. 1, the location of constellation point P1 is (1,1), the location of constellation point P2 is (−1,1), the location of constellation point P3 is (−1, −1) and the location of constellation point P4 is (1, −1). A typical method of estimating the noise power is as follows: First, an acceptance square 10 is defined by the points (2,2), (−2,2), (−2,−2) and (2,−2). If the received data is in the acceptance square 10, the hardware calculates the distance between the data and the nearest constellation point (i.e., P1, P2, P3 or P4), the distance is squared, and the resulting value is accumulated (i.e., summed) for N symbols. If the data is outside of the acceptance square (i.e., in area 12 in FIG. 1), the data is marked as an erasure and is ignored by the algorithm. An average is taken over a large number of samples to get the average noise power and to determine the signal to noise ratio.

The signal to noise ratio is typically calculated using the following method: First, it is observed that for 4QAM the power of the signal is exactly 2. The noise power is calculated as:

$$NP = \Sigma D(n)^2 / N$$

Where N is the number of samples that fall within the acceptance square and D(n) is the distance between the n'th sample and the nearest constellation point.

It is well observed that the above method is efficient in high signal to noise ratio, but is not accurate when the signal to noise ratio is low. The reason is two fold: First, the computation ignores the samples that fall outside of the acceptance square even though these samples carry the biggest errors; second, if the error is large enough such as a sample that corresponds to a constellation point which is farther than the closest constellation point, the implementation will underestimate the error.

OBJECTS AND SUMMARY

An object of an embodiment of the present invention is to provide a correction calculation algorithm which better estimates the signal to noise ratio for the case of low signal to noise ratio.

Briefly, an embodiment of the present invention provides a method for correcting signals received on a channel. The method includes receiving a plurality of signals along the channel, determining how many of the signals are outside a predetermined range relative to a plurality of predetermined constellation points, estimating the noise power based on the number of signals which have been received and determined to be outside the predetermined range, and using the noise power which has been calculated to correct at least some of the signals.

Specifically, preferably an algorithm is used which does the following:

Uses the number of erasures to estimate the noise power in the channel.
  Uses the noise power estimation to add correction for the samples that were marked as erasure.
  Uses the noise power estimation to correct for large errors that result in underestimation of the error.
  Modify the sum of square errors by adding the previous two correction to the sum of the squared errors and calculate the modified average noise power.

Preferably, the algorithm can be used for many modulation types, such as for BPSK, as well as for 4QAM and other QAM values.

BRIEF DESCRIPTION OF THE DRAWINGS

The organization and manner of the structure and operation of the invention, together with further objects and advantages thereof, may best be understood by reference to the following description, taken in connection with the accompanying drawings, wherein.

DESCRIPTION

While the invention may be susceptible to embodiment in different forms, there is shown in the drawings, and herein will be described in detail, a specific embodiment of the invention. The present disclosure is to be considered an example of the principles of the invention, and is not intended to limit the invention to that which is illustrated and described herein.

Figure 2:
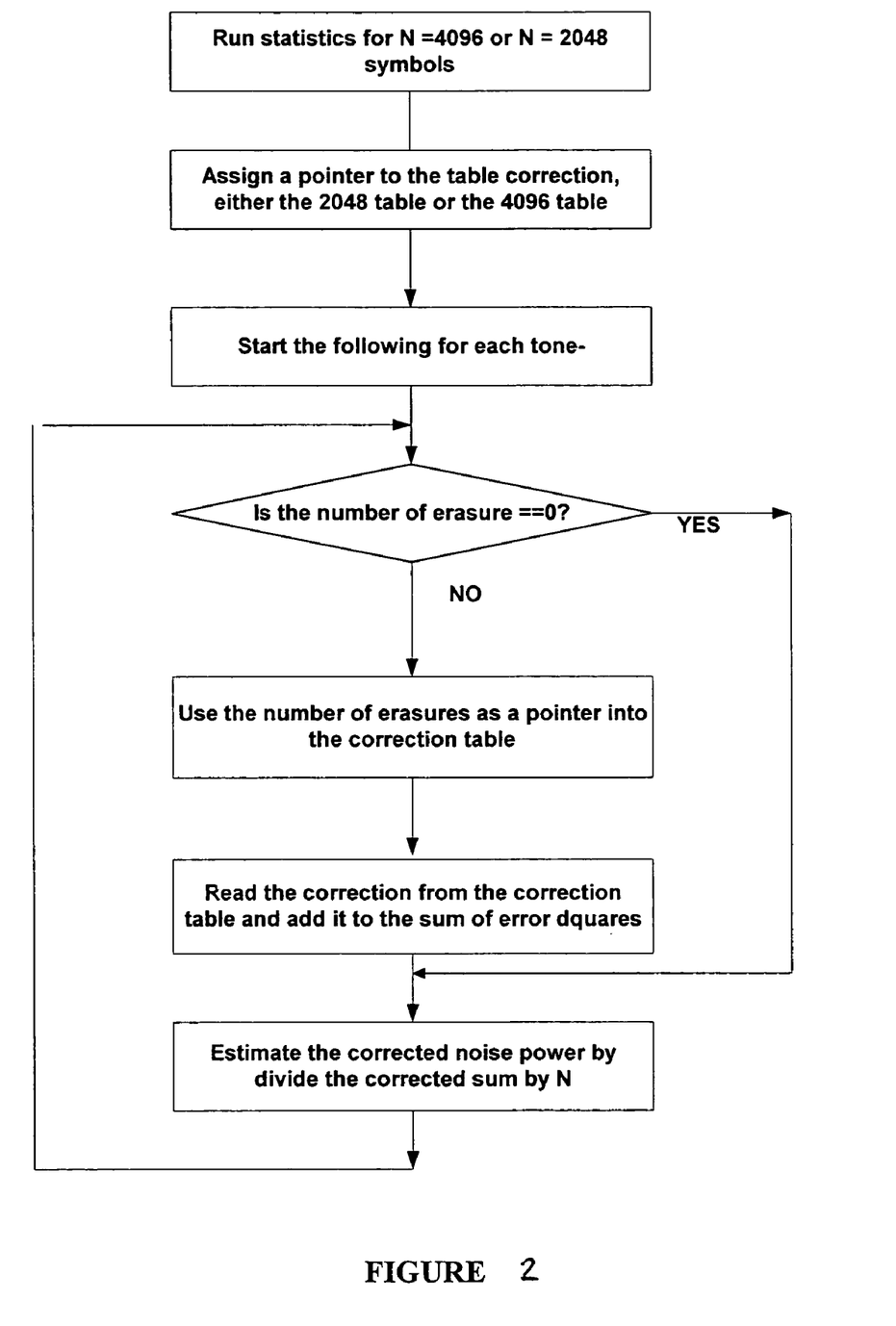
FIG. 2 illustrates a correction-calculation algorithm which is in accordance with an embodiment of the present invention.

An embodiment of the present invention provides a correction calculation algorithm, such as is shown in FIG. 2, which better estimates the signal to noise ratio for the case of low signal to noise ratio. The algorithm can be used for many modulation types, such as for BPSK, as well as for 4QAM and other QAM values.

The 4QAM signal is generated in the transmitter side as a fixed two bits value for each discrete tone. Let X(n) be the signal value for the n'th symbol:

1. $X(n) = (1, 1)$ with probability 0.25

$(-1, 1)$ with probability 0.25

$(-1, -1)$ with probability 0.25

$(1, -1)$ with probability 0.25

$X(n)$ is a two dimension complex process, that is, $$X(n)=c(n)+j*d(n). \quad (2)$$

The one-dimensional processes $c(n)$ and $d(n)$ are independent of each other.

In the transmitter, the signal $X(n)$ goes through IFFT to convert it from frequency domain to time domain, digital filtering, digital to analog conversion, and analog filtering before being transmitted over a pair of copper wires. In the receive side, the analog signal goes through analog filters, analog to digital conversion, digital filtering and fft to return back to the frequency domain. All these processes add errors to the receive signal. Let $Y(n)$ be the receive signal after the ffM. From the demodulation point of view, $Y(n)$ can be considered as two dimension received signal, that is:

$$Y(n)=X(n)+\gamma \quad (3)$$

Where $\gamma$ is a two-dimension vector error that is the accumulation of all the errors that are described above and $Y(n)$ is a two-dimension complex, that is $$Y(n)=a(n)+j*b(n). \quad (4)$$

The algorithm to evaluate the noise power for the process that is defined in (2) uses the role of the large number. It estimates the noise power by accumulating the square distance between the $X(n)$ process and the $Y(n)$ for a large number of symbols N, and then divides the sum by N. The hardware implementation is the following:

First, the hardware defines a new process $Z(n)$ as a hard-limited version of $Y(n)$ and a one dimension count process $I(n)$ that counts the number of erasures, as described below:

5. $Z(n) = 0$          if $|a(n)| > 2$ or $(b(n)| > 2$ $(a(n) - p_x)^2 + (b(n) - p_y)^2$    Otherwise Where $p_x$ and $p_y$ are the x and y coordinates of the constellation points that is the nearest to $Y(n)$.

Next, the count process $I(n)$ is defined

6. $I(n) = 0$    if $|a(n)| > 2$ or $(b(n)| > 2$

1    Otherwise

Let S be the sum of $Z(n)$ and I counts the number of non-zero values of $Z(n)$, that is $$S=\Sigma Z(n) \quad (7)$$

$$I=\Sigma I(n) \quad (8)$$

The current approximation for the noise power is given by $\text{Power}_{Noise}=S/I$ Since the power of the signal is always 2, the signal to noise ratio, SNR is given by $$SNR=2*I/S \quad (9)$$

Or SNR is given in decibel units, $$SNR_{decibel}=10*LOG_{10}(2*I/S) \quad (10)$$

Even though the noise process $\gamma$ is the sum of many errors, and thus not necessarily a Gaussian process, using a Gaussian approximation is justified because the average is that of a large number of symbols. The following assumption will be made for the model of the Noise process $\gamma$:

$\gamma$ is a two dimensional complex process $\gamma=(\gamma_x, \gamma_y)$ $\gamma_x$ and $\gamma_y$ are two independent identical Gaussian processes with mean 0 and $\sigma$ variance. That is for any value of $\alpha$:

$$P(\gamma_x<\alpha)=P(\gamma_y<\alpha)=1/(sqrt(2*\pi)*\sigma)\int(e^{-x^2/2\sigma^2})dx \quad (11)$$

Where the integral goes from minus infinity to $\alpha$. Using the notation for the cumulative distribution function of the normal distribution with mean 0 and variance 1, equation (11) becomes:

$$P(\gamma_x<\alpha)=P(\gamma_y<\alpha)=\phi(\alpha/\sigma) \quad (12)$$

Description of the New Algorithm

Figure 3:
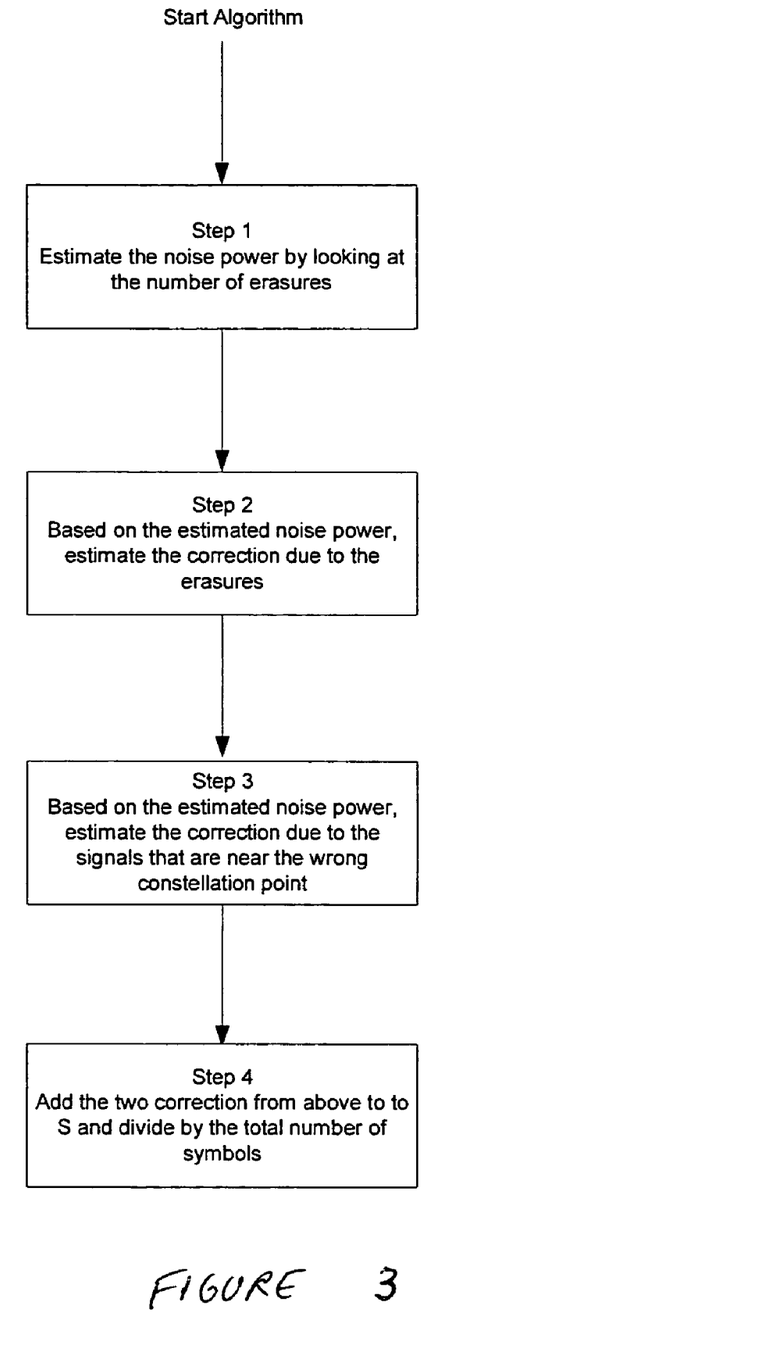
FIG. 3 illustrates an algorithm to better estimate SNR.

FIG. 3 illustrates an algorithm to better estimate SNR.

Step 1—Estimation of the Noise Power

Figure 4:
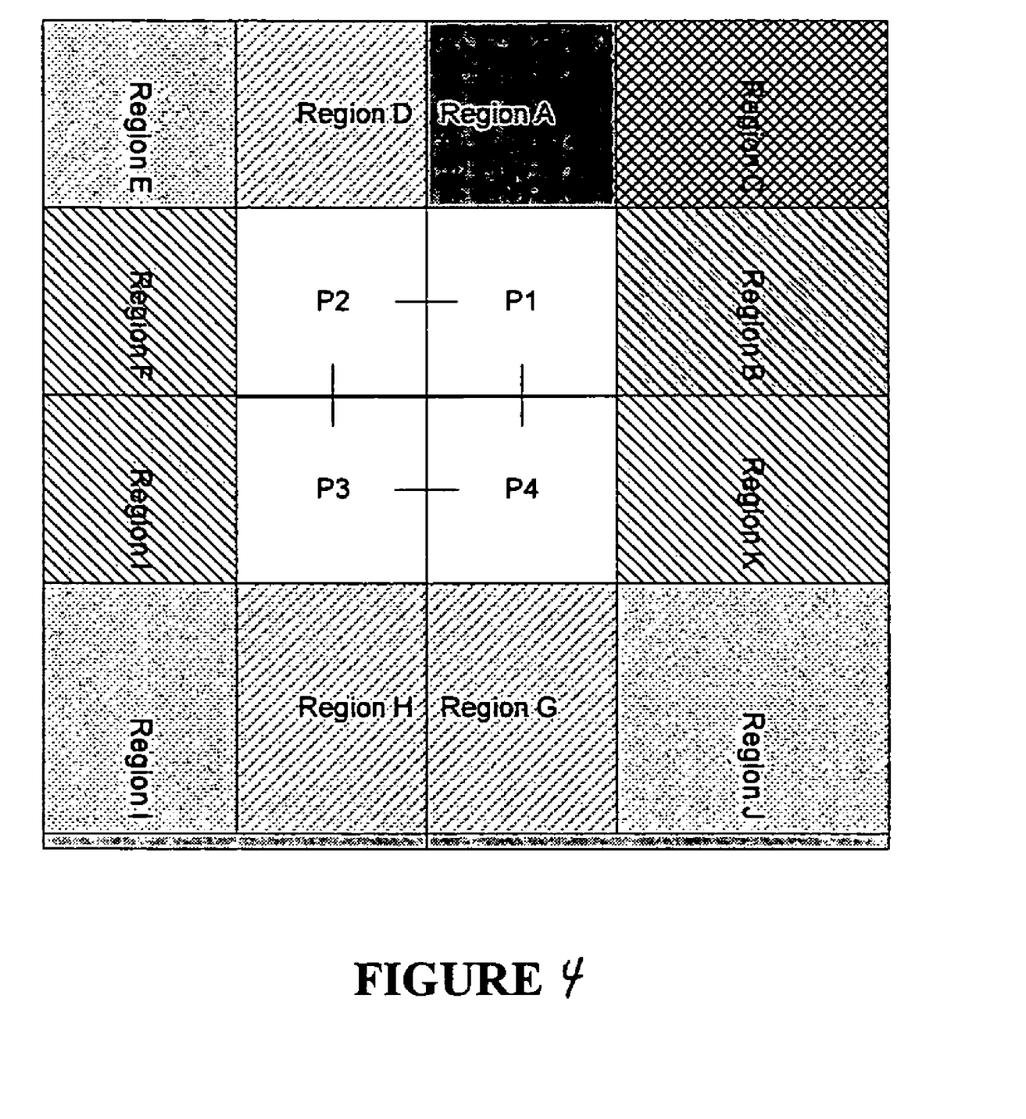
FIG. 4 shows the erasure region divided into several sub-regions.

Because of the symmetry of the model, the independence of the $X(n)$ process and the noise process, it is sufficient to analyze the results for one constellation point only. Assume $X(n)$ has the value $(1,1)$. The probability of erasure from equation (5) is the probability that either $|a(n)|$ or $|b(n)|$ is more than 2. FIG. 4 divides the erasure region to several sub-regions.

Using (12) and the independency between $\gamma_x$ and $\gamma_y$, it is easy to see that if $X(n)$ is $(1,1)$:

$$P(Y(n) \text{ is in regions } A,C,D,E)=P(\gamma_y>1)=1-\phi(1/\sigma) \quad (13)$$

$$P(Y(n) \text{ is in regions } L,H,G,J)=P(\gamma_y<-3)=\phi(-3/\sigma) \quad (14)$$

$$P(Y(n) \text{ is in regions } C,B,K,J)=P(\gamma_x>1)=1-\phi(1/\sigma) \quad (15)$$

$$P(Y(n) \text{ is in regions } E,F,I,L)=P(\gamma_x<-3)=\phi(-3/\sigma) \quad (16)$$

$$P(Y(n) \text{ is in region } C)=P(\gamma_y>1)*P(\gamma_x>1)=(1-\phi(1/\sigma))*(1-\phi(1/\sigma)) \quad (17)$$

$$P(Y(n) \text{ is in region } E)=P(\gamma_y>1)*P(\gamma_x<-3)=(1-\phi(1/\sigma))*\phi(-3/\sigma) \quad (18)$$

$$P(Y(n) \text{ is in region } L)=P(\gamma_y<-3)*P(\gamma_x<-3)=\phi(-3/\sigma)*\phi(-3/\sigma) \quad (19)$$

$$P(Y(n) \text{ is in region } J)=P(\gamma_y<-3)*P(\gamma_x>1)=\phi(-3/\sigma)*(1-\phi(1/\sigma)) \quad (20)$$

Using the identity $$1-\phi(x)=\phi(-x) \quad (21)$$

it is easy to show that the probability that a signal that was originated from constellation point $(1,1)$ is marked as an erasure is equal to

22.

$$P_{erasure} = 2*\phi(-1/\sigma) + 2*\phi(-3/\phi) - \phi(-1/\sigma)*\phi(-1/\sigma) - 2*\phi(-1/\sigma)*\phi(-3/\sigma) - \phi(-3/\sigma)*\phi(-3/\sigma) =$$
$$(\phi(-1/\sigma)+\phi(-3/\sigma))*(\phi(1/\sigma)+\phi(3/\sigma))$$

Considering the symmetry of the model, and the equal probability of equation (1), equation (22) represents the probability of an erasure.

Let N be the number of samples that are observed. If N>>1, and I is as defined in equation (8), then I/N converges to the probability of erasures.

For practical reasons, when the number of erasures reaches 1/16 of the number of samples that are observed, the algorithm does not calculate the signal to noise ratio. In a typical case N=4096. Thus, the number of erasures can vary from 0 to 255. For each value of I, we have the following relationship:

$$23. I/N = 2*\phi(-1/\sigma) + 2*\phi(-3/\sigma) - \phi(-1/\sigma)*\phi(-1/\sigma) - 2*\phi(-1/\sigma)*\phi(-3/\sigma) - \phi(-3/\sigma)*\phi(-3/\sigma) = (\phi(-1/\sigma) + \phi(-3/\sigma))*(\phi(1/\sigma) + \phi(3/\sigma))$$

Figure 5:
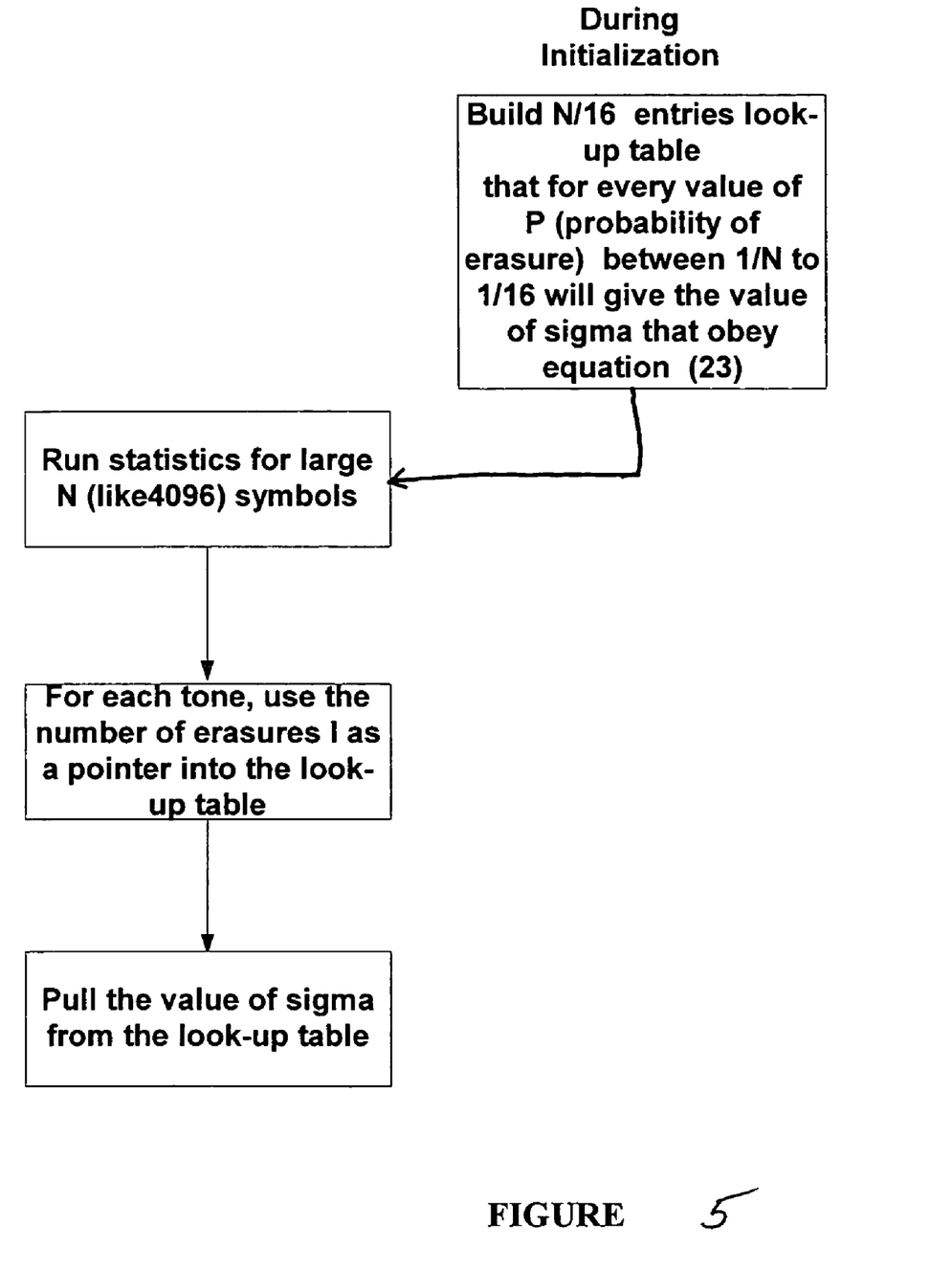
FIG. 5 illustrates an algorithm to estimate noise power.

Thus, the algorithm to estimate the noise power is as illustrated in FIG. 5.

As described later herein, the look-up table for the $\sigma$ as a function of I/N is replaced with a table that gives the correction to the sum S from equation (7) as a function of I/N. The above table and algorithm are not used.

Step 2—Estimation of the Correction Due to Erasures

Because of the symmetry of the model, only the correction for signals that were generated by the (1,1) constellation point will be analyzed. The results will be true for all other constellation points.

The average square error that is ignored by the sum S of equation (7) depends on the erasure region. For a generic rectangular region R={(x,y) such that a+1<x<b+1 and c+1<y<d+1} and a signal that is originated from the constellation point (1,1), the contribution of the average square error C is given by $$C_R = (1/((2*\pi)*\sigma^2))\iint(u^2+v^2)(e^{-u2/2\sigma2})du(e^{-v2/2\sigma2})dv \quad (24)$$

Where the 2-D integral is taken over the region R.={(u,v) such that a<u<b and c<v<d}. Separation of the integral in (24) to two integrals, one with $u^2$ and one with $v^2$, and using well known integration formula yields:

$$C_R = \sigma^2(A(d)-A(c))*\{A(b)-A(a)+T(a)-T(b)\}+\sigma^2(A(b)-A(a))*\{A(d)-A(c)+T(c)-T(d)\} \quad (25)$$

Where $$A(x)=\phi(x/\sigma)) \quad (26)$$

And $$T(x)=1/(sqrt(2*\pi)*(x/\sigma*e**(-(x^2/2\sigma^2))) \quad (27)$$

Similarly, the following definition will be used later:

$$B(x)=1/(sqrt(2*\pi)*(e**(-(x^2/2\sigma^2))) \quad (28)$$

Region (C and A and D and E) a=minus infinity, b=infinity, c=1, d=infinity. The average error in this region is:

$$C_{LHGJ}=\sigma^2\{2(1-A(1))+T(1)\} \quad (29)$$

1. Region (L and H and G and J) a=minus infinity, b=infinity, c=minus infinity, d=-3(d+1<-2). The average error in this region is:

$$C_{LHGJ}=\sigma^2\{2(A(-3))-T(-3)\} \quad (30)$$

2. Region (B and K) a=1, b=infinity, c=-3(c+1>-2), d=1 (d+1<2). The average error in this region is:

$$C_{BK}=\sigma^2\{(A(1)-(A(-3))*(1-A(1)+T(1))+(1-A(1))*(A(1)-A(-3)+T(-3)-T(1)) \quad (31)$$

3. Region (F and I) a=minus infinity, b=-3, c=-3(c+1>-2), d=1 (d+1<2). The average error in this region is:

$$C_{FI}=\sigma^2\{(A(1)-(A(-3))*(A(-3)-T(-3))+(A(-3))*(A(1)-A(-3)+T(-3)-T(1)) \quad (32)$$

So that the total contribution from the erasures regions is $$C_{erasure}=C_{LHGJ}+C_{LHGJ}+C_{BK}+C_{FI} \quad (33)$$

Step 3—Estimation of the Correction of Samples in the Wrong Constellation Point

Because of the symmetry of the model, only the correction for signals that were generated by the (1,1) constellation point will be analyzed. The results will be true for all other constellation points.

Figure 6:
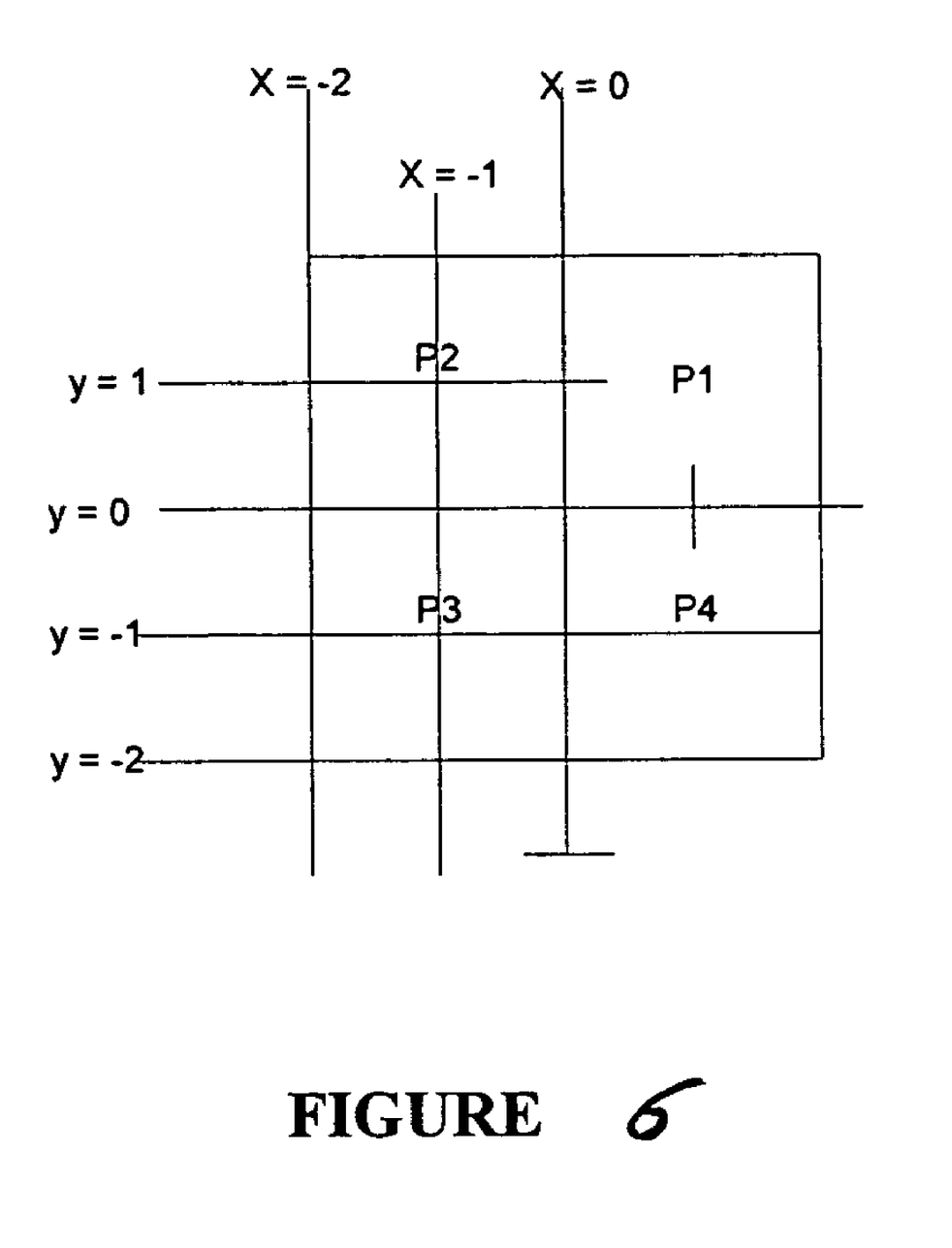
FIG. 6 illustrates the areas of error due to the wrong constellation point.

FIG. 6 illustrates the areas of error due to the wrong constellation point. First, we calculate the error in calculating the noise power for samples that was generated by the constellation point P1 and is received in P2. In that case, $-1<\gamma_y<1$ and $-3<\gamma y_x<-1$. The real square error is equal to:

$$\text{Error\_P2}_{real}=\gamma_y^2+\gamma_x^2 \quad (34)$$

The measured squared error is the distance between the sample point and Constellation point P2 (−1,1)

$$\text{Error\_P2}_{measured}=\gamma_y^2+(2+\gamma_x)^2=\text{Error\_P2}_{real}+4+4*\gamma_x \quad (35)$$

Thus, the correction to add to the sum of the error square due to samples in R2 is:

$$D\_P2=(1/((2*\pi)*\sigma^2))\iint(-4+-4*u)(e^{-u2/2\sigma2})du(e^{-v2/2\sigma2})dv \quad (36)$$

Where the u boundaries are between −3 to −1, and v boundaries are between −1 to 1.

$$D\_P2=(A(-1)-A(1))*4*\{(A(-1)-A(-3))+\sigma*(B(1)-B(3))\} \quad (37)$$

Next, we observed that because of the symmetry between $\gamma_x$ and $\gamma_y$, the contribution of P4 is equal to the contribution of P2, that is $$D\_P4=D\_P2 \quad (38)$$

Finally, we calculate the contribution from P3. Again the real error is $\gamma_y^2+\gamma_x^2$ and the measured error is given by:

$$\text{Error\_P3}_{measured}=(2+\gamma_y)^2+(2+\gamma_x)^2=\text{Error\_P3}_{real}+8+4*\gamma_x+4*\gamma_y \quad (39)$$

$$D\_P3=(1/((2*\pi)*\sigma^2))\iint-(8+4*\gamma_x+4*\gamma_y)(e^{-u2/2\sigma2})du(e^{-v2/2\sigma2})dv \quad (40)$$

Where the u boundaries are between −3 to −1, and v boundaries are between −3 to −1. Again, using symmetry $$D\_P3==(A(-3)-A(-1))*8*\{(A(-1)-A(-3))+\sigma*(B(1)-B(3))\} \quad (41)$$

Step 4—Add All Corrections to the Sum S
The total correction is:

$$\text{Total\_correction}=C_{LHGJ}+C_{LHGJ}+C_{BK}+C_{FI}+2*D\_P2+D\_P3 \quad (42)$$

So $$S=S+\text{Total\_correction} \quad (43)$$

And $$SNR=2*N/S \quad (44)$$

When N is the total number of samples for which the statistics are taken.

Implementation of the New Algorithm in Fixed Point Arithmetic

The first part of the algorithm is building the correction tables. This is performed during initialization. The number of tables that are built is the number of various symbols that are integrated during the calculation of SNR. In a typical system, the integration is done either on 2048 symbols or 4096 symbols. Thus, two tables will be built, one with 127 entries and one for 255 respectively.

The format of the tables must agree with the format of the noise power data as it is measured and manipulated by the hardware. The following are the considerations for the table's format.

Let the (x,y) value of the constellation points have the format nQm, that is n binary digits with m digit on the right on the binary point. If the error in x or y is more than a unit, the error will be marked as erasure or the sample will be closer to another constellation point and thus the error will be underestimated.

The square error in x and y has 2n bits, where the binary point is after 2m bits. Depending on the multiplier, the result of the square might be shifted one place to avoid two sign bits.

The square error is summed and stored in a register. The number of bits in the register is $2n+LOG_2(M)$ where M is the number of symbols that are summed and n is at least m+1. A typical case is where M=4096 and m=12. In this case, the minimum number of bits in the summation register is 24+2+12=38.

The tables are calculated using double precision floating point format. Since the table value is added to a sum that has a format of (2n+12)Q2m, the conversion between the floating point value and the fixed point value is performed by multiplying the floating point value by 2**12=4096.0, adding 0.5, and casting the value to long integer.

A table for N=2048 is as follows:
15231
28609
42507
56793
101414
116772
132339
148101
164047
180169
196457
212905
229506
246256
263149
280182
297350
314650
332079
349633
367311
385109
403025
421058
439204
457463
475833
494311
512897
531589
550385
569285
588286
607389
626591
645892
665291
684797
704379
724066
743847
763722
783689
803749
823900
844142
864473
884895
905405
926004
946691
967464
988325
1009272
1030305
1051424
1072627
1093915
1115288
1136744
1158284
1179907
1201613
1333401
1245272
1267224
1289258
1311374
1333570
1355847
1378205
1400643
1423160
1445758
1468435
1491192
1514028
1536942
1559936
1583008
1606158
1629387
1652694
1676078
1699541
1723081
1746698
1770393
1794165
1818014
1841940
1865943
1890022
1914177
1938410
1962719
1987104

2011565
2036102
2060715
2085404
2110169
2135010
2159927
2184918
2209986
2235129
2260348
2285641
2311011
2336455
2361975
2387570
2413240
2438986
2464805
2480701
2516671
2542716
2568837
2595032
2621302
2647647
2674067
2700562

A table for N=4096 is as follows:
8837
15231
21842
28609
35504
42507
49607
56793
64059
71399
78808
86283
93819
101414
109066
116772
124530
132339
140196
148101
156052
164047
172087
180169
188292
196457
204661
212905
221186
229506
237863
246256
254685
263149
271649
280182
288750
297350
305984
314650
323349
332079
340841
349633
358457
367311
376195
385109
394053
403025
412027
421058
430117
439204
448320
457463
466634
475833
485059
494311
503591
512897
522230
531589
540974
550385
559822
569285
578773
588286
597825
607389
606977
626591
636229
645892
655580
665291
675027
684787
694571
704379
714210
724066
733945
743847
753773
763722
773694
783689
793708
803749
813813
823900
834009
844142
854296
864473
874673
884895
895139
905405
915694
926004
936336

946691
957067
967464
977884
988325
98788
1009272
1019778
1030305
1040854
1051424
1062015
1072627
1083261
1093915
1104591
1115288
1126005
1136744
1147503
1158284
1169085
1179907
1190750
1201613
1212497
1223401
1234326
1245272
1256238
1267224
1278231
1289258
1300306
1311374
1322461
1333570
1344698
1355847
1367016
1378205
1389414
1400643
1411891
1423160
1434449
1445758
1457087
1468435
1479804
1491192
1502600
1514028
1525475
1536942
1548429
1559936
1571462
1583008
1594574
1606158
1617763
1629387
1641031
1652694
1664376
1676078
1687800
1699541
1711301
1723081
1734880
1746698
1758536
1770393
1782269
1794165
1806080
1818014
1729967
1841940
1853931
1865943
1877972
1890022
1902090
1914177
1926284
1938410
1950555
1962719
1974902
1987104
1999325
2011565
2023824
2036102
2048399
2060715
2073050
2085404
2097778
2110169
2122580
2135010
2147459
2159927
2172413
2184918
2197443
2209986
2222548
2235129
2247729
2260348
2272985
2285641
2298317
2311011
2323724
2336455
2349206
2361975
2374763
2387570
2400395
2413240
2426103
2438986
2451886
2464805
2477744
2490701
2503676

2516671
2529685
2542716
2555767
2568837
2581925
2595032
2608157
2621302

2634465
2647647
2660848
2674067
2687305
2700562
2713837

A C code algorithm to build the table is as follows:

```c
/***********************************************************************
******
*
* build_table.c   A program to build a look-up table that
* will be used to improve the SNR calculations
* The table build program will be done in several stages -
*
* 1. Build PHI(x) table - cumulative distribution function of the normal
*    distribution and compare it to the given table, only to test the
*    accuracy of the integral method
* 2. Build a table for I/N of equation 23 of the paper and find the values for
*    I goes from 1 to 255, where N is 4096 - or any other number up to M/16
* 3. Build the tables for the various corrections only for the 255 values from above
* 4. Invert the tables and get the final look-up table of equation 42
*
* Ran Katzur starting day 11-18-03
*
***********************************************************************
**/
#include <stdio.h>
#include <math.h>
#define M       4096 // number of symbols
#define TABLE_SIZE 20000
#define END_POINT 4
#define TABLE_SIZE_M_DIVIDE_16 M/16
double delta_t ;
double t_vector[TABLE_SIZE+1] ;
double pfi_of_one_over_sigma[TABLE_SIZE+1] ;
double pfi_of_three_over_sigma[TABLE_SIZE+1] ;
double I_over_N[TABLE_SIZE+1] , I_N_M[TABLE_SIZE+1] ;
double integer_I_N_M[TABLE_SIZE_M_DIVIDE_16] ;
double phi_minus_one_over_sigma_for_integer_I_N[TABLE_SIZE_M_DIVIDE_16] ;
double phi_minus_three_over_sigma_for_integer_I_N[TABLE_SIZE_M_DIVIDE_16] ;
double one_over_sigma[TABLE_SIZE_M_DIVIDE_16] ;
double correction_table[TABLE_SIZE_M_DIVIDE_16] ;
double x_delta ;
double x_value1 ;
double x_value2 ;
double t_value ;
double integral_value ;
double *p_t1, *p_t2 , *p_pfi1, *p_pfi2 ;
double one_over_square_root_2_pi ;
double in ;
double integral_function(double t_start, double delta_t) ;
double interpolation_f(double xx,int loop9,double *vector) ;
FILE *fp1 ,*fp2 ;
#define ONE 1.01
#defineI_COMPARE_LIMIT (double) (M/16)
main( )
{
   int loop1 , i_sigma3 ;
double i_compare ,diff ;
double xx ;
   int loop9 ,index ;
   double alfa, beta ;
double A_1, T_1, A_minus_3 , T_minus_3 ;
   double A_minus_1, B_minus_1, B_minus_3;
   double B_1, B_3 ;
   double real_sigma ,sigma_square ;
   double C_LHGJ, C_BK, C_FI, C_CADE ;
   double D_P2, D_P3, D_P4 ;
   double C_TOTAL, D_TOTAL , TOTAL ;
   double h1,h2,h3,h4 ;
   h1 = 8.0 * atan(1.0) ; // h1 is 2*pi
```

-continued

```
    h2 = sqrt(h1) ;
one_over_square_root_2_pi = 1.0 / h2 ;
    if (M == 2048)
        {
        fp1 = fopen("correction_table_128.dat", "w") ;
        fp2 = fopen("integer_correction_128.dat", "w") ;
    }
    else if (M == 4096)
        {
    fp1 = fopen("correction_table_256.dat", "w") ;
        fp2 = fopen("integer_correction_256.dat", "w") ;
    }
    else
        {
            printf(" M is not supported YET \n") ;
            return −1 ;
        }
        t_vector[TABLE_SIZE/2 −1] = 0.0 ;
        pfi_of_one_over_sigma[TABLE_SIZE/2 −1] = 0.5 ;
        p_t1 = (double *) &t_vector[TABLE_SIZE/2 −1] ;
        p_t2 = p_t1 ;
        p_pfi1 = (double *) &pfi_of_one_over_sigma[TABLE_SIZE/2 − 1] ;
        p_pfi2 = p_pfi1 ;
        t_value = 0.0 ;
        x_value1 = 0.5 ;
        x_value2 = 0.5 ;
    delta_t = (double)(END_POINT) / ( (double) (TABLE_SIZE/2) ) ;
    p_t1++ ;
        p_t2−− ;
        p_pfi1++ ;
        p_pfi2−− ;
        for (loop1 = 0; loop1 < TABLE_SIZE/2 ; loop1++)
            {
                x_delta = integral_function(t_value, delta_t);
                t_value = t_value + delta_t ;
        *p_t1++ = t_value ;
            *p_t2−− = −t_value ;
            x_value1 = x_value1+ x_delta ;
            x_value2 = x_value2 − x_delta ;
            *p_pfi1++ = x_value1 ;
            *p_pfi2−− = x_value2 ;
    }
/*      starting the second Table - find I/N    */
/*      How do we build the I/N tables?
    for each sigma (that is the t_value) we calculate the 3*sigma= sigma_3
        if 3*sigma is less than the minimum, 3*sigma is the minimum
        The phi sigma table is the x table,
        we wll fill the pfi_of_three_over_sigma table
        calculate the I/N value and the same value multiply by M
        */
        for (loop1 = 0; loop1 < TABLE_SIZE + 1 ; loop1++)
            {
            i_sigma3 = (loop1 + 1 − (TABLE_SIZE/2) ) * 3 ;
            if (i_sigma3 < 0) i_sigma3 = 0 ;
                if (i_sigma3 > TABLE_SIZE ) i_sigma3 = TABLE_SIZE ;
                x_value2 = pfi_of_one_over_sigma[i_sigma3] ;
            pfi_of_three_over_sigma[loop1] = x_value2 ;
            x_value1 = pfi_of_one_over_sigma[loop1] ;
                in = 2.0 * x_value1 + 2 * x_value2 − x_value1 * x_value1
                    −2.0 * x_value1 * x_value2 − x_value2 * x_value2 ;
            I_over_N[loop1] = in ;
                I_N_M[loop1] = in * (double) M ;
        }
        i_compare = 1.0 ;
        /* print the first value to a file and vector */
        for (loop1 = 0; loop1 < TABLE_SIZE ; loop1++)
            {
/*      from now on, we print only the values that are the closest
        for integer I. To do so, we first look for difference that goes
            down. When it starts to go up again, we print
*/
        diff = i_compare − I_N_M[loop1] ;
            if (i_compare < I_COMPARE_LIMIT)
                {
                if (diff < 0.0)
                    {
/*      In addition to print the results, we will build a new set of tables
        where the index is the I of I/N
            And we do linear interpolation for the exact location of I
        Linear interpolation -
```

```
    step 1. Find the value of x such that I_N_M is a exactly i_compare
        the value is loop1-1 + (I_N_M[loop1-1]/(I_N_M[loop1] -I_N_M[loop1-1])
    step 2: for any given function, the exact value of the function for x is fiven by
        f(x) = f(loop1-1) + (x - loop1 +1) /(f(loop1) - f(loop1-1)
        A small utility function - interpolate_f with parameters x, loop1 and a
pointer
            to the table will calculate the interpolated value
 */
    loop9 = loop1 -1 ;
    alfa = I_N_M[loop9] - i_compare ;
        beta = I_N_M[loop1] - i_compare ;
    xx = -alfa/(beta - alfa) ;
        index = (int) i_compare - 1 ;
        integer_I_N_M[index] = xx ;
        phi_minus_one_over_sigma_for_integer_I_N[index] =
interpolation_f(xx,loop9,pfi_of_one_over_sigma) ;
        phi_minus_three_over_sigma_for_integer_I_N[index] =
interpolation_f(xx,loop9,pfi_of_three_over_sigma) ;
        one_over_sigma[index] = interpolation_f(xx,loop9,t_vector) ;
    // fprintf(fp1, "%d %le %le %le %le \n",index, xx,
phi_minus_one_over_sigma_for_integer_I_N[index],
        //      phi_minus_three_over_sigma_for_integer_I_N[index],
one_over_sigma[index]) ;
    //printf(" %lf %lf \n",t_vector[loop1], pfi_of_one_over_sigma[loop1]) ;
        // fprintf(fp2," %d %le %le %le %le %f\n",loop1,
t_vector[loop1],
        // pfi_of_one_over_sigma[loop1],
pfi_of_three_over_sigma[loop1],I_over_N[loop1],I_N_M[loop1]) ;
            i_compare = i_compare + ONE ;
        }
        }
    }
/*  Equation (42) look-up table calculation ---->
1.  Remember phi(-x) = 1 - phi(x)
2.  For each i build T(X) and A(X) and B(x)
3.  Build all the corrections C_ and D_
4.  Build the final table as a floating point and integer
*/
    for (loop1= 0; loop1 < TABLE_SIZE_M_DIVIDE_16; loop1++)
    {
        real_sigma = 1.0/one_over_sigma[loop1] ;
    //A_1 is phi(1/sigma) = 1.0 - phi(-1/sigma) = 1.0 -
phi_minus_one_over_sigma_for_integer_I_N[loop1]
    A_1 = 1.0 - phi_minus_one_over_sigma_for_integer_I_N[loop1] ;
        // A_minus_1 = phi_minus_one_over_sigma_for_integer_I_N[loop1]
    A_minus_1 = phi_minus_one_over_sigma_for_integer_I_N[loop1] ;
        //T_1 = 1/sqrt(2*pi) * 1/sigma * exp(-1/2*sigma*sigma)
// T_1 = -one_over_square_root_2_pi *one_over_sigma[loop1] *
//          exp(- one_over_sigma[loop1] * one_over_sigma[loop1] /2.0) ;
        h1 = one_over_square_root_2_pi ;
        h2 = -one_over_sigma[loop1] ;
        h3 = -one_over_sigma[loop1] ;
        h4 = h3 * h3 ;
        h4 = - h4/2.0 ;
        h3 = exp(h4) ;
        T_1 = h1 * h2 * h3 ;
        //A_minus_3 = phi_minus_three_over_sigma_for_integer_I_N[loop1]
    A_minus_3 = phi_minus_three_over_sigma_for_integer_I_N[loop1] ;
    //T_minus_3 = 1/sqrt(2*pi) * -3/sigma * exp(-9/2*sigma*sigma)
    // T_minus_3 = -one_over_square_root_2_pi *3*one_over_sigma[loop1] *
        //      exp(- 9.0*one_over_sigma[loop1] * one_over_sigma[loop1]
/2.0) ;
    //  h1 = one_over_square_root_2_pi ;
        h2 = 3*one_over_sigma[loop1] ;
        //h3 = -one_over_sigma[loop1] ;
        h4 = h2 * h2 ;
        h4 = -h4/2.0 ;
        h3 = exp(h4) ;
        T_minus_3 = h1 * h2 * h3 ;
    //B_1 and B_minus_1 are the same 1/sqrt(2*pi) * exp(-1/2*sigma*sigma)
    B_1 = one_over_square_root_2_pi *
            exp(- one_over_sigma[loop1] * one_over_sigma[loop1] /2.0) ;
        B_minus_1 = B_1 ;
    //B_3 and B_minus_3 are the same 1/sqrt(2*pi) * exp(-9/2*sigma*sigma)
    B_3 = one_over_square_root_2_pi *
            exp(- 9.0 * one_over_sigma[loop1] * one_over_sigma[loop1]
/2.0) ;
        B_minus_3 = B_3 ;
    h1 = 1.0/one_over_sigma[loop1] ;
        sigma_square = h1 * h1 ;
```

```
        C_CADE = ( sigma_square ) * ( 2.0 * (1.0 - A_1) +T_1) ;
        C_LHGJ = ( sigma_square ) * ( 2.0 * ( A_minus_3) - T_minus_3) ;
     C_BK = sigma_square*((A_1 - A_minus_3)*(1.0 -A_1+T_1) +
            (1.0 -A_1)*(A_1-A_minus_3-T_1+T_minus_3) ) ;
     C_FI = sigma_square*((A_1 - A_minus_3)*(A_minus_3 - T_minus_3) +
            (A_minus_3)*(A_1-A_minus_3-T_1+T_minus_3) ) ;
        C_TOTAL = C_CADE + C_LHGJ + C_BK + C_FI ;
        D_P2 = ( A_minus_1 - A_1)* 4.0 * ( A_minus_1-A_minus_3 + h1
*(B_1 - B_3)) ;
        D_P4 = D_P2 ;
        D_P3 = 8.0 * (A_minus_3 - A_minus_1) * (A_minus_1-A_minus_3 +
h1 *(B_1 - B_3)) ;
        D_TOTAL = D_P2 + D_P3 + D_P4 ;
     TOTAL = C_TOTAL + D_TOTAL ;
        correction_table[loop1] = TOTAL ;
        fprintf(fp1," %d %le \n",loop1, TOTAL) ;
        fprintf(fp2,"%ld \n",(long)(TOTAL * 16777216.0+ 0.5) ) ;
     }
}
#define NUMBER_INTERVAL 2000
double integral_function(double t_start, double delta_t)
{
    double x2 ;
    double delta_x ;
    double minus_x_square ;
    double exponent_x ;
  double sum ;
  int loop ;
    delta_x = delta_t /( (double) NUMBER_INTERVAL) ;
  sum = 0 ;
    x2 = t_start+ delta_x/2 ;
    for (loop =0; loop < NUMBER_INTERVAL; loop++)
    {
        minus_x_square = - x2 * x2 /2.0 ;
        exponent_x = exp(minus_x_square) ;
        sum = sum + exponent_x * delta_x ;
        x2 = x2 + delta_x ;
    }
    return (sum * one_over_square_root_2_pi );
}
double interpolation_f(double xx,int loop9,double *vector)
{
    double ff ;
    double v1, v2, slop ;
    v1 = vector[loop9] ;
    v2 = vector[loop9+1] ;
    slop = v2 - v1 ;
//   xx = xx - (double) (loop9) ;
    ff = v1 + xx * slop ;
    //ff = vector[loop9] + (xx ) * (vector[loop9+1] - vector[loop9]) ;
    return (ff) ;
// return (v1) ;
}
```

While an embodiment of the present invention is shown and described, it is envisioned that those skilled in the art may devise various modifications of the present invention without departing from the spirit and scope of the appended claims.

What is claimed is:

1. A method for correcting signals received on a channel, said method comprising:
    receiving a plurality of signals along the channel;
    keeping track of a value which represents how many signals out of the plurality of signals are at least a certain distance from a plurality of predetermined constellation points, wherein the value gets stored in a register;
    only if the value is less than 1/16th of the number of signals received along the channel, using the value to estimate the noise power;
    forming and using a look up table to determine the correction to be applied in order to correct at least some of the signals; and
    applying the correction, thereby changing at least some of the signals.

2. A method as recited in claim 1, further comprising using the noise power which has been estimated to correct the signals which have been determined to be outside the predetermined range.

3. A method as recited in claim 1, further comprising determining how far each of the signals is from a predetermined constellation point.

4. A method as recited in claim 1, further comprising determining how far each of the signals is from a predetermined constellation point, and using the noise power which has been estimated to correct signals which have been determined to be far from the closest constellation point.

5. A method as recited in claim 1, further comprising using the noise power which has been estimated to correct the signals which have been determined to be outside the predetermined range, determining how far each of the signals is from a predetermined constellation point, using the noise power which has been estimated to correct signals which have been determined to be far from the closest constellation point, and modifying a sum of square errors by adding the corrections to the sum.

6. A method as recited in claim 5, further comprising using the modified sum of square errors to calculate a modified average noise power.

7. A method as recited in claim 1, wherein the correction is based on the number of signals which have been determined to be outside the predetermined range.

8. A method for correcting signals received on a channel, said method comprising:
- receiving a plurality of signals along the channel;
- keeping track of a value which represents how many signals out of the plurality of signals are at least a certain distance from a plurality of predetermined constellation points, wherein the value gets stored in a register;
- forming and using the value and look up tables to determine correction values to be applied in order to correct at least some of the signals; and
- using the correction values to change at least some of the signals.

9. A method as recited in claim 8, further comprising using the correction value to correct the signals which have been determined to be outside the predetermined range.

10. A method as recited in claim 8, further comprising determining how far each of the signals is from a predetermined constellation point.

11. A method as recited in claim 8, further comprising determining how far each of the signals is from a predetermined constellation point, and using the correction value to correct signals which have been determined to be far from the closest constellation point.

12. A method as recited in claim 8, further comprising correction value to correct the signals which have been determined to be outside the predetermined range, determining how far each of the signals is from a predetermined constellation point, using the correction value to correct signals which have been determined to be far from the closest constellation point, and modifying a sum of square errors by adding the correction value to the sum.

13. A method as recited in claim 12, further comprising using the modified sum of square errors to calculate a modified average noise power.

* * * * *